United States Patent
Stingl et al.

(10) Patent No.: US 6,625,184 B1
(45) Date of Patent: Sep. 23, 2003

(54) COOLING DEVICE FOR AN OPTICAL CRYSTAL OR LASER CRYSTAL

(75) Inventors: Andreas Stingl, Korneuburg (AT); Ferenc Krausz, Korneuburg (AT)

(73) Assignee: Femtolasers Produktions GbmH (AU)

( * ) Notice: Subject to any disclaimer, the term of this patent is extended or adjusted under 35 U.S.C. 154(b) by 0 days.

(21) Appl. No.: 09/555,087

(22) PCT Filed: Oct. 22, 1998

(86) PCT No.: PCT/AT98/00256

§ 371 (c)(1),
(2), (4) Date: Jul. 18, 2000

(87) PCT Pub. No.: WO99/27621

PCT Pub. Date: Jun. 3, 1999

(30) Foreign Application Priority Data

Nov. 24, 1997 (AT) ............................................. 1992/97

(51) Int. Cl.[7] ............................................. H01S 3/042
(52) U.S. Cl. ........................................... 372/36; 372/34
(58) Field of Search ..................... 372/36, 34

(56) References Cited

U.S. PATENT DOCUMENTS

| | | | | | |
|---|---|---|---|---|---|
| 4,752,936 A | * | 6/1988 | Gerhardt | ....................... | 372/62 |
| 4,787,088 A | * | 11/1988 | Horikawa | .................... | 372/34 |

FOREIGN PATENT DOCUMENTS

| | | |
|---|---|---|
| DE | 3307933 | 10/1984 |
| DE | 3922800 | 7/1989 |
| DE | 4229500 | 3/1994 |
| EP | 0259888 | 3/1988 |
| JP | 59-197186 | 11/1984 |
| JP | 1122183 | 5/1989 |
| JP | 2-156583 | 6/1990 |
| JP | 6-338569 | 12/1994 |

OTHER PUBLICATIONS

"0.2–TW laser system at 1 kHz" vol. 22, No. 16, dated Aug. 15, 1997.

"Generation of 0.1–TW 5–fs optical pulses at a 1–kHz repetition rate" vol. 22 No. 20, dated Oct. 15, 1997.

* cited by examiner

*Primary Examiner*—James Davie
(74) *Attorney, Agent, or Firm*—Ostrolenk, Faber, Gerb & Soffen, LLP

(57) ABSTRACT

A cooling device for an optical amplifier or oscillator has Peltier elements enclosed in a housing with an optical crystal and extract heat from the optical crystal. The housing is sealed and can contain a desiccant for removing moisture and preventing particle deposition. Alternately, the housing can be evacuated with a vacuum to maintain a clean operating environment. The housing holds a Brewster window at a Brewster angle with an incident laser beam to permit passage of the laser beam. The housing also can be arranged on a platform providing liquid cooling.

36 Claims, 8 Drawing Sheets

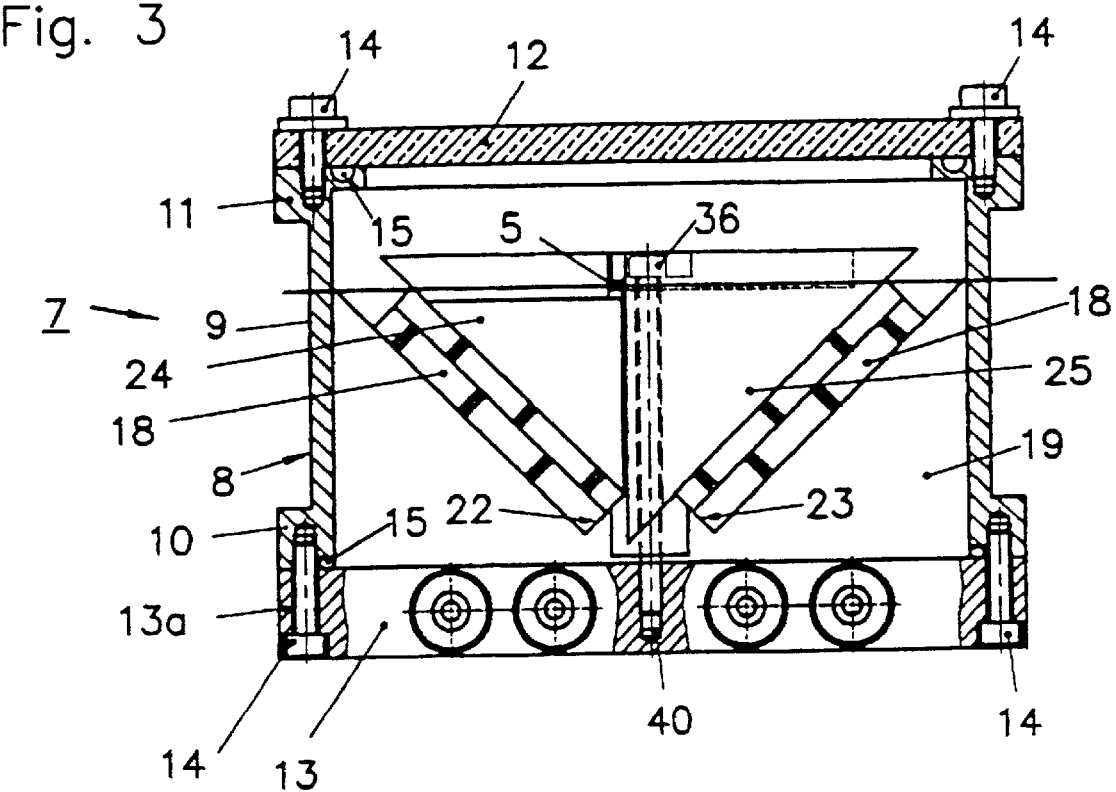

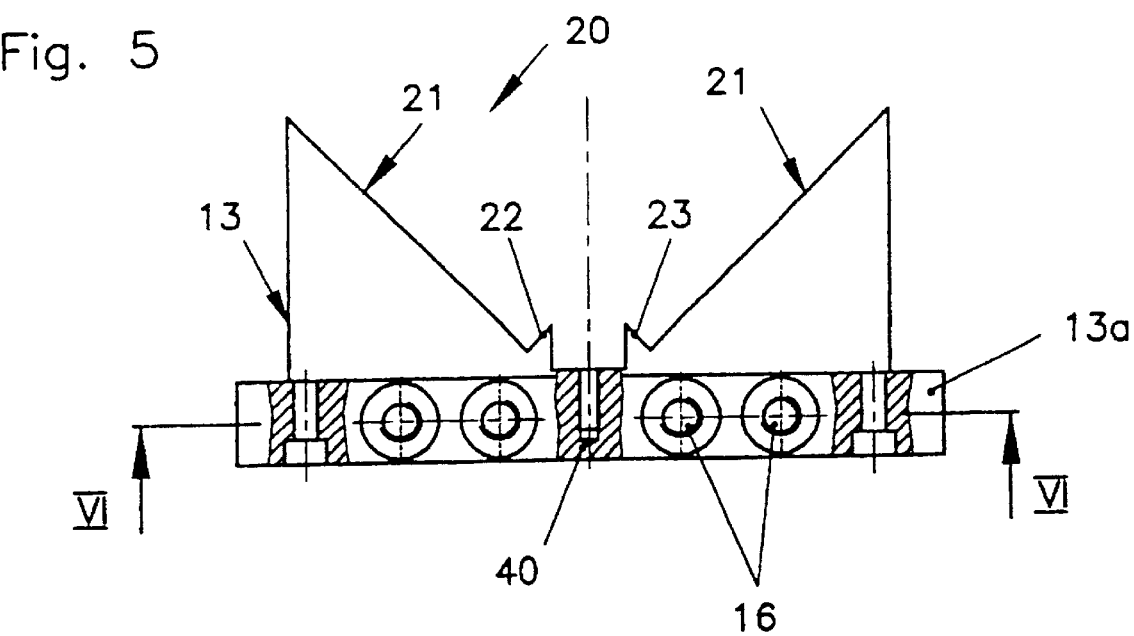
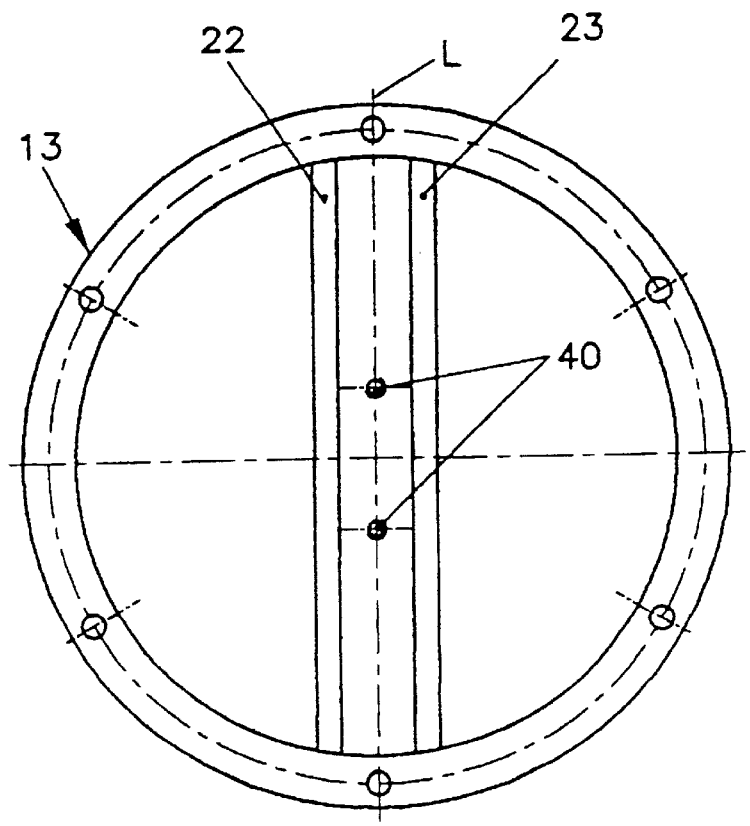

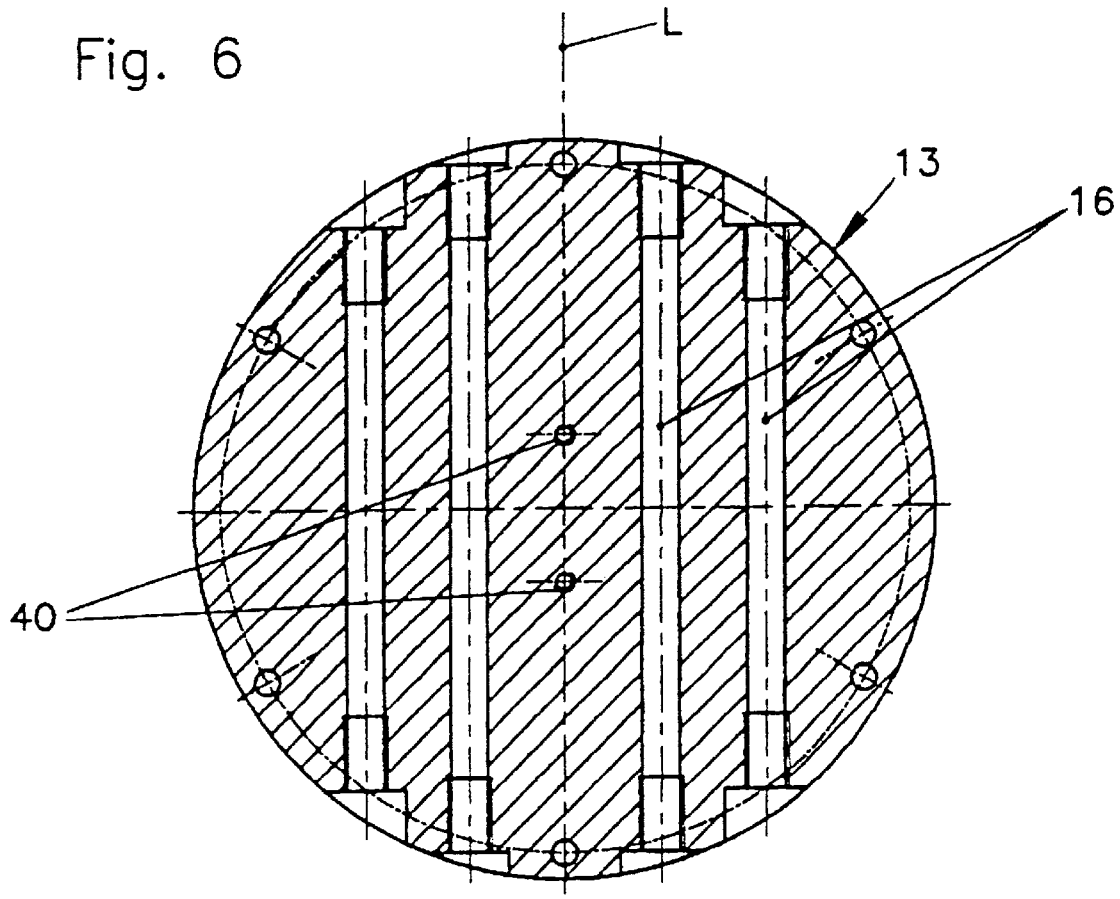

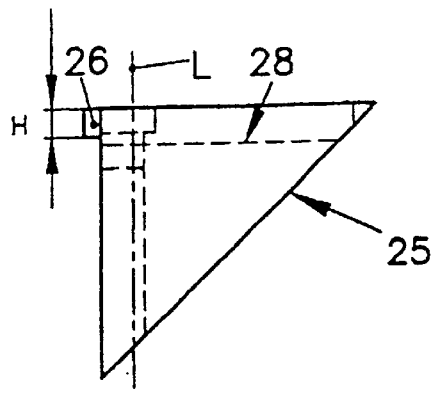
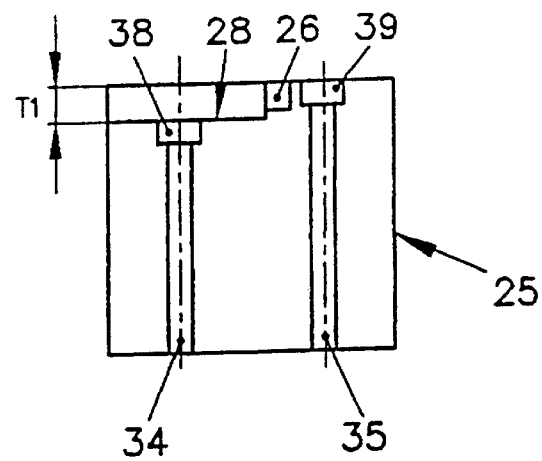
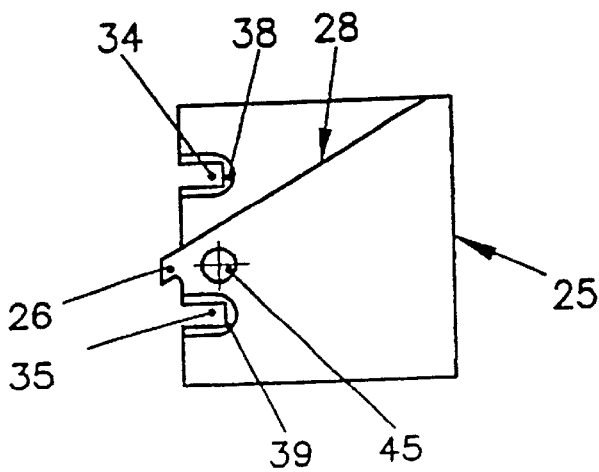

COOLING DEVICE FOR AN OPTICAL CRYSTAL OR LASER CRYSTAL

BACKGROUND OF THE INVENTION

1. Field of the Invention

The invention relates to a cooling device comprising Peltier elements for a thermally highly loaded optical crystal, or laser crystal, respectively, from which laser beams, in particular laser pulses, are obtained, e.g. for the laser crystal of an optical amplifier or oscillator.

2. Description of Related Art

An effective cooling of optical crystals, or laser crystals, respectively, "crystals" in short hereinafter, in laser devices is of particular importance if the crystals, e.g. titanium-sapphire crystals (commonly termed Ti:S laser crystals) are subjected to high thermal loads during operation. This is, e.g., the case if in a passively mode-locked short-pulse laser arrangement (oscillator) the crystal is utilized as an optically non-linear element, and the pump beam and the resonator beam are focussed as highly as possible in the crystal; in doing so, the crystal should have small dimensions and, for compensation thereof, a high dotation so as to keep low the material dispersion, whereby the—specific—thermal load will rise, as has been explained in the earlier application WO-98/10 494-A not previously published. There it has also been explained that cooling to below 10° C. is a problem because of the humidity condensation occurring in that instance, wherein little drops condensed on the crystal may cause the crystal to be damaged rapidly or even to be destroyed.

What is of quite particular importance is, moreover, cooling of the crystal in case of an optical amplifier, as has already been mentioned in Optics Letters Vol. 22, No. 16, Aug. 15, 1997, pp. 1256–1258, "0.2-TW laser system at 1 kHz" by Backus et al. In such an optical post-amplification of oscillator pulses, e.g., also a Ti:S laser crystal is used in which the pulses from the oscillator having an energy of some nJ are amplified to an energy in the order of 1 mJ (i.e., by the factor $10^6$). To this end, the Ti:S amplifier crystal is "pumped" with green laser light which, e.g., has an average power of 10 to 20 W, which is a multiple of the pumping power at the laser pulse generation in the oscillator. Also by the fact that the optical amplifier is operated in pulses (the pulse frequency being, e.g., approximately 1 kHz), the pumping energy is concentrated to individual pulses which amplify the oscillator pulses. Due to the high powers occurring there, it is important to attain sufficient cooling for the crystal. Insufficient cooling of the crystal will not only result in a poor efficiency, similarly as with the oscillator, but also in an unfavorable beam profile, due to the "thermal lenses" effect which also is explained in the afore-mentioned article by Backus et al. If the crystal is heated, the temperature gradient thus occurring in its material will lead to a refraction index gradient which will unintentionally focus or defocus the laser beam during its passage—depending on the crystal material. Good cooling of the crystal will increase the thermic conductivity of the crystal material, and the temperature coefficient of the refraction index (which causes the "thermal lense" effect) becomes smaller at the low temperatures so that a beam profile approximately corresponding to the ideal Gaussian intensity profile (over the cross-section) will be attained; moreover, the degree of efficacy will be improved. According to the article by Backus et al., liquid nitrogen is used to cool the crystal, which does make it possible to attain extraordinarily low temperatures, by which, however, a practicable embodiment of the optical amplifier is prevented for many purposes of application, in particular for mobile uses.

A somewhat different optical amplifier has been described in the article "Generation of 0.1-TW 5-fs optical pulses at a 1-kHz repetition rate" by S. Sartania et al., Optics letters Vol. 22, No. 20, Oct. 15, 1997, wherein general mention is made that a Peltier cooling device is used for cooling the amplifying crystal. Thus, the problem remains that with an intensive cooling not only condensation water will form on the crystal, but even ice, and that contaminations are present in the air which will deposit on the crystal; in operation, such ice formations and contaminations will lead to a—localized—destruction of the crystal surface by burning in.

SUMMARY OF THE INVENTION

It is an object of the invention to overcome these problems and to provide a cooling device of the initially defined type with which, on the one hand, in spite of a simple construction that will render it particularly suitable for mobile applications, a good cooling in terms of a high degree of efficacy and an optimum beam profile will be achieved, and by which, on the other other hand, a long useful life of the laser crystal will be ensured by avoiding burning in of condensation water (ice), or impurities, respectively.

The inventive cooling device of the initially defined type is characterized in that the crystal, together with the Peltier elements provided for its cooling, is housed in an encasing container, that the interior of the container is evacuated and/or kept dry by means of a desiccating substance, and that the container comprises at least one Brewster window for the passage of the laser beams which is arranged under an angle relative to the optical axis which corresponds to the Brewster angle.

By providing an encasing container it becomes possible to evacuate the container interior or to keep it dry so that condensation water cannot deposit on the optical crystal, or laser crystal, respectively; moreover, defined clean surroundings (vacuum or pure, i.e. contamination-free, dry air) are possible for the crystal. Accordingly, long operating times can be achieved which is a great advantage also with a view to the expenditures required during the installation or during the precise adjustment of optical crystals, or laser crystals, respectively. Moreover, the present cooling device is characterized in that as a consequence of the use of the thermoelectric cooling elements, i.e. Peltier elements, in combination with the encasing container, a compact, simple, handy construction of the laser arrangement is made possible whereby, moreover, its use in vehicles, e.g. also in airplanes, is possible without any problems, since in contrast to cooling with liquid nitrogen, it is not gravity-dependent during its operation. The container may be provided with a tightly closable connection means for an evacuation as well as with tightly sealed electrical line passages for the power supply of the Peltier elements.

With a view to the high intensities occurring in the applications in question, so-called Brewster windows are provided on the container for the passage of the laser beams. In this manner, unintentional reflections can be prevented, i.e. without the broad-band antireflex coatings otherwise used therefor; because such dielectric coatings would not withstand the afore-mentioned high intensities (e.g. peak powers in the MW to GW range at beam diameters of <10 mm and at pulse durations in the 10 fs to ps range, starting from an average power of 10 mW up to the watt range; pump parameters: average power, a few W up to a few 10 W; pump energy, a few mJ; high repetition frequencies in the kHz range which will lead to peak powers in the kM to MW range).

It should be mentioned that with semi-conductor lasers it is known to use encapsulated modules, cf., eg., DE 33 07 933 C, DE 39 22 800 A, JP 1-122 183 A or EP 259 888 A, in which a laser diode element is present in combination with a Peltier element. However, there are no high laser powers and thus also merely low thermal loads on the laser diode elements, and the Peltier elements in fact are merely used for temperature stabilizing purposes. In the known semi-conductor lasers, this is important because in case of laser diodes, the laser wave length depends substantially on the temperature of the semi-conductor chip, and in many instances even its heating is required so as to obtain the correct wave length. Besides, in these known devices, an evacuation of the module or its drying by means of desiccating substances are not mentioned.

With the Peltier elements, in most instances sufficient cooling of the laser crystals can be achieved without any problems, and it has been shown that a temperature difference of approximately 50° C. or 70° C. at the Peltier elements will suffice in most instances. For a particularly pronounced cooling or heat dissipation from the laser crystal it may also be advantageous if the Peltier elements are provided in stacked manner. In this instance, temperatures of −50° C. or −100° C. may easily be reached on the cold side at an ambient temperature (approximately 20° C.) on the warm side. As such, temperature differences at the Peltier elements of up to 130° C., when using conventional Peltier elements, are possible so that cooling may be effected to temperatures of below −100° C.

The optical crystal, or laser crystal, respectively may be platelet-shaped and—with a view to the good cooling attainable—of comparatively small dimensions, and also if used with an amplifier, its dimensions may be merely approximately 3 mm in width and length, with a height of merely 1 to 1.5 mm.

To fix the crystal while ensuring a good thermal transition and a good thermal dissipation, it is also advantageous if the crystal is held between cooling jaws of good thermal conductivity, against which the Peltier elements rest. In doing so, for attaining as large a thermal transition surface as possible as well as a particularly simple retention of the crystal it is, moreover, suitable if the cooling jaws positively embrace and retain the crystal at four sides thereof. A solution which is suitable in terms of production and mounting will moreover be achieved if one of two cooling jaws resting against the crystal at opposites sides thereof has a nose projection extending over the crystal resting on the other cooling jaw, and the cooling jaws are provided with recesses in front of or behind the crystal, respectively, in the direction of the laser beams for the laser beams to pass therethrough.

To keep the Peltier elements on the "warm" side at ambient temperature (or even therebelow), it is furthermore advantageous if the Peltier elements are in engagement with a cooling pedestal on their warm side that faces away from the cooling jaws. For efficiently cooling the warm side of the Peltier elements it has also proven advantageous if the cooling pedestal is liquid-cooled. The cooling pedestal may have the most varying shapes, such as, e.g., cuboid or disk-shaped. To attain a high cold storage capacity as well as for a stable accommodation of the Peltier elements and the cooling jaws and for a simple production it is furthermore suitable if the cooling pedestal is formed by a generally cyllindrical body having a generally V-shaped recess at an end side which accommodates the Peltier elements as well as the cooling jaws with the crystal. For reasons of processing and also for the abutment surface of the Peltier elements and the cooling jaws it is advantageous if the V-shaped recess comprises an apex angle of 90°. To orient the Peltier elements and to facilitate their mounting it is, moreover, advantageous if the generally V-shaped recess defines oblique resting surfaces for the Peltier elements and stops for the Peltier elements are provided at the inner, adjacent ends of the resting surfaces, which stops project upwardly from the resting surfaces.

A particularly simple design of the encapsulated type container which allows for a good sealing, e.g. by means of O-rings, may be obtained if the container comprises a tubular casing closed by a lid. In this connection it is, furthermore, advantageous if the cooling pedestal at its end side facing away from the Peltier elements is provided with a flange with which the tubular casing is tightly connected. It is also advantageous if the cooling pedestal is provided with bores for the passage of cooling liquid in the region of the flange.

For the laser beams to have a low power relative to the area unit of their cross-section, when passing through the window, (so that they will not cause burning in or destruction of the windows after short periods of operation), the laser beams should have as large a cross-section as possible at the site of the windows, i.e. they should be out of focus, which means that for the windows a certain distance should be kept (e.g. approximately 8 to 10 cm) to the crystal—where focussing occurs. To make this possible without enlarging the entire container, it is also suitable if the encasing container, preferably at oppositely arranged sides thereof, is provided with a (respective) projecting, tightly attached pipe socket which, at its outer end, is closed by the window for the passage of the laser beams.

The invention also relates to a laser arrangement comprising a cooling device as explained above.

BRIEF DESCRIPTION OF THE DRAWINGS

In the following, the invention will be explained in more detail by way of a preferred exemplary embodiment illustrated in the drawing to which, however, it shall not be restricted. In detail.

FIG. 3 shows an axial section through this cooling device according to line III—III of FIG. 2;

FIG. 4 shows a top view onto a mounting and cooling pedestal used with this cooling device;

FIG. 5 shows a view of this cooling pedestal in the region of the lower flange part, partially sectioned;

FIG. 6 shows a cross-section through the flange region of this cooling pedestal, according to line VI—VI of FIG. 5;

FIGS. 8A to 8C show the other cooling jaw used with the cooling device according to FIGS. 2 and 3, also in a top view (FIG. 8A), an elevational view (FIG. 8B) and an end view (FIG. 8C)

DETAILED DESCRIPTION OF THE PREFERRED EMBODIMENTS

In the following, the cooling device according to the invention will be explained in more detail by way of example in combination with an optical amplifier as is schematically shown in its essential parts in FIG. 1; although the cooling device has particular advantages in optical amplifiers because of its efficient cooling effect, it can also be used with other laser arrangements, e.g. with oscillators. Moreover, the materials indicated below for the optical crystal, or laser crystal, respectively (titanium-sapphire crystal) as well as those indicated for the construction of the pump laser (frequency-doubled Nd:YLF-laser neodym-yttrium-lithium-fluoride laser) are to be understood to be an example only.

Figure 1:
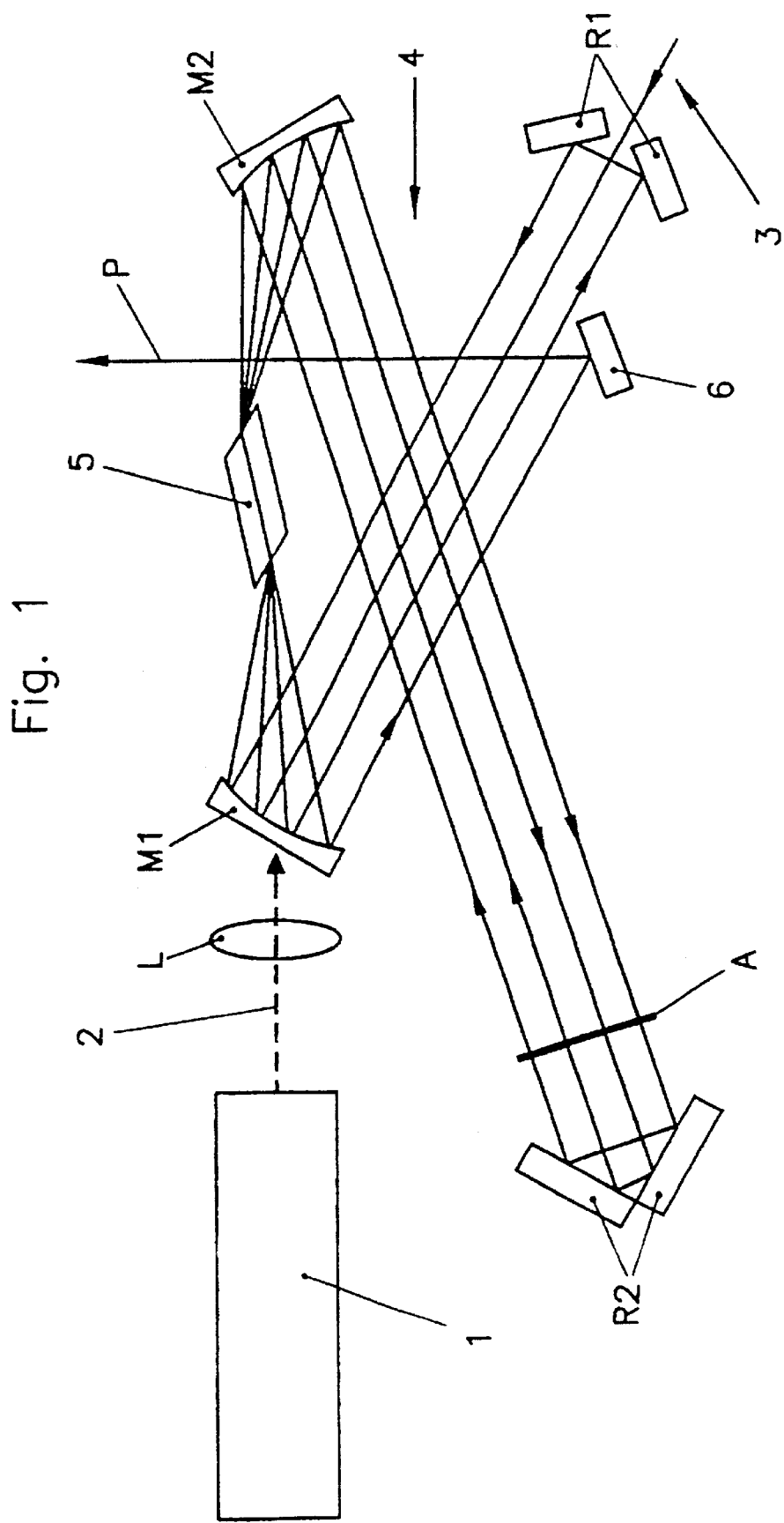
FIG. 1 shows a diagramm of the essential parts of an optical amplifier.

In FIG. 1, an arrangement of the essential components of an optical amplifier are schematically illustrated, wherein, in the example illustrated, the optical amplifier is illustrated as so-called "multipass-amplifier", cf. also the afore-mentioned paper by Backus et al., "0.2-TW laser system at 1 kHz". The invention could, of course, also be employed in other optical amplifiers, i.e. particularly in so-called regenerative amplifiers, where a repeated, colinear passage of the laser beam occurs before the laser beam leaves the amplifier, e.g. by aid of Pockels cells.

In detail, in FIG. 1 a pump laser is schematically shown at 1, e.g. a frequency-doubled Nd-YLF laser which outputs a laser beam, the so-called pump beam, which is schematically indicated at 2 in FIG. 1 and which supplies the energy for the amplification of laser pulses. At 3, these laser pulses are supplied by a conventional laser oscillator not illustrated in detail to the amplifier arrangement proper, generally denoted by 4. The essential element for this amplifier arrangement 4 is an optical crystal, or laser crystal, respectively, 5, termed crystal in short hereinafter, e.g. a Ti:S crystal, also merely quite schematically shown in FIG. 1, without any cooling device, in which crystal the laser beams are focussed at the various passages indicated by various lines with corresponding arrows. In particular, two focussing mirrors M1, M2 are provided for the amplifying beam at either side of the crystal 5, wherein at least the focussing mirror M1 is semitransparent so as to allow the pump beam 2 coming from a focussing lense L1 to pass to the crystal 5. Moreover, in FIG. 1 retroreflectors are further shown at R1 and R2 for the amplifying beam which provide for the various multipass-positions of the laser beam in space, the retroreflectors R1 moreover being arranged at a predetermined distance from each other so that the laser pulses arriving from the oscillator there can enter through the gap thus formed into the amplifying arrangement 4. Thereafter, an aperture A comprising, e.g., a 4, 6 or 8 hole aperture is arranged in front of the retroreflectors to suppress the laser activity in the amplifier 4, and a mirror 6 is provided for decoupling the intensified laser pulses. The intensified laser pulses P may, e.g., by supplied to a compressor as is known per se and therefore has not been illustrated in detail, and in this compressor the laser pulses may be shortened in terms of their duration.

For an optical amplification, a pump laser 1 is used which, e.g., generates pulses of a frequency of approximately 1 kHz and with an average power of 10 to 20 W. Since the laser pulses to be amplified arrive from the oscillator at a frequency higher by several orders of magnitude, usually also an arrangement comprising, e.g., Pockels cells is used in combination with the amplifying arrangement 4 so as to suppress non-amplified pulses, which, however, has not been illustrated in detail in FIG. 1. For further information in this respect, reference may be made to the already mentioned article by Sartania et al., "Generation of 0.1-TW 5-fs optical pulses at a 1-kHz repetition rate", or to the article by Backus et al., "0.2-TW laser system at 1 kHz". For a better understanding, it should be mentioned that, e.g., the laser pulses which arrive from the oscillator have a frequency of 75 MHZ, and that only every 75,000th pulse is allowed to pass and is enriched with energy—which comes from the pump laser.

With a view to the high powers which the pump pulses have as well as with a view to the focussing of these pump pulses in a relatively small crystal volume, a correspondingly high heat will develop there so that efficient cooling of the crystal is highly important. Yet with a view to industrial applications of the amplifier or, generally, the laser arrangement, cooling with liquid nitrogen, as in the known arrangement, is not suitable and not handy and, moreover, dependent on gravity so that such a cooling device is not suitable for mobile uses.

A cooling device generally denoted by 7 will now be explained by way of FIGS. 2 to 9, which cooling device meets the requirements set, such as sufficient cooling, compact, simple, handy construction, independence on gravity etc., and which, moreover, is characterized in that long periods of operation can be achieved for the crystals.

Figure 2:
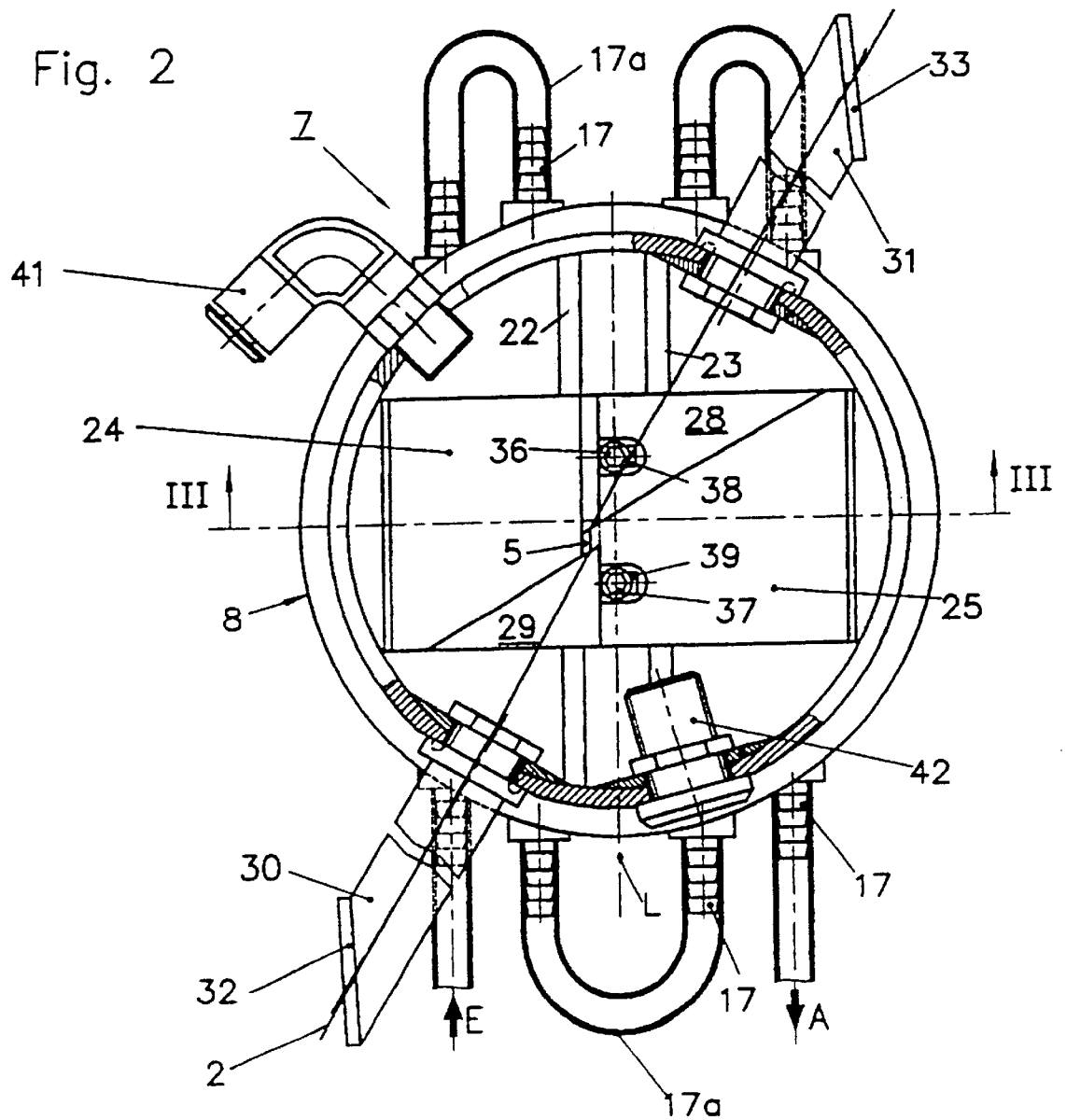
FIG. 2 shows a sectioned top view onto a cooling device for the laser crystal used in such an optical amplifier.

As apparent from FIGS. 2 and 3, the cooling device 7 comprises an enclosure-type, tightly closed container 8 having a tubular casing 9 with end-side flanges 10, 11 on which a lid 12 and a cooling pedestal 13 are fastened via a flange 13a by means of screws 14, additional O ring seals 15 of rubber or elastic plastic being provided between the flanges 10, 11, on the one hand, and the lid 12 or the cooling pedestal 13, on the other hand.

As is particularly apparent from FIGS. 5 and 6, the cooling pedestal 13 comprises four parallel bores 16 for the passage of a cooling liquid, e.g. water, connecting fittings 17 (cf. FIG. 2) being screwed into the ends of the bores 16 which serve for the successive switching of the bores 16 via the ducts or hoses 17a indicated in FIG. 2 in broken lines. Cooling liquid will, e.g., enter according to arrow E and exit according to arrow A.

The cooling pedestal 13 is made of copper or aluminum, e.g., whereas the lid 12 may, e.g., consist of plastic and the tubular casing 9, e.g., of aluminum.

From the base of the cooling pedestal 13, an externally general cylindrical body 19 extends upwardly which serves to accommodate Peltier elements 18, e.g. the Peltier elements 18 commercially available under the name Melcor Thermoelectrics 2 2 SC 055 045-127-63 and contacts on the inner wall of the tubular casing 9. In its middle part, the body 19 has a V-shaped recess 20 comprising an apex angle of 90° so that on either side of the center line L (cf. FIG. 2), two resting surfaces 21 are defined for the Peltier elements 18, the inner, adjacent ends of the resting surfaces 21 having upwardly projecting stops 22, 23 for the Peltier elements 18. In the exemplary embodiment illustrated, two blocks of Peltier elements 18 are each stacked in superposition on the resting areas 20. The heat-emitting or "hot" side of the Peltier elements 18 here contacts the two resting surfaces 21, whereas the heat-accommodating or "cold" side of the Peltier elements 18 contacts two cooling jaws 24, 25 which fix the Peltier elements 18 in their position, and have a shape which can be seen in FIGS. 7A to 7C and 8A to 8C in detail.

Figure 7C:
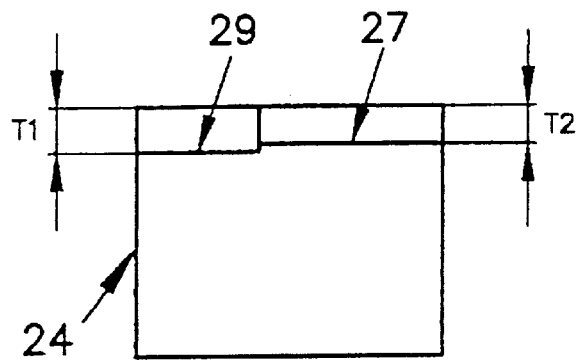
FIGS. 7A to 7C show one of the cooling jaws for the laser crystal used with the cooling device according to FIGS. 2 and 3, in a top view (FIG. 7A), an elevational view (7B) and an end view (FIG. 7C)
Figure 7B:
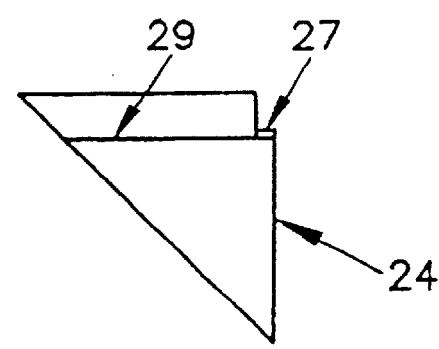

As is particularly apparent from the elevational views according to FIGS. 7B and 8B, the cooling jaws 24 and 25 are generally wedge-shaped with lateral angles of, e.g., 45°, so that they fill the V-shaped recess with the apex angle of 90° of body 19 in their mounted state. The cooling jaw 25 arranged at the right-hand side of the middle line I in FIG. 2 has a nose projection 26 (cf. FIG. 8B) which extends over the cooling jaw 24 arranged to the left of the middle line L and abuts the crystal 5 by its lower side (cf. also FIG. 9 in addition to FIGS. 2 and 3), the crystal resting in a stepped recess 27 of the cooling jaw 24 (cf. FIG. 7B). The crystal 5 has the shape of a parallelepiped with an optical main axis which is oriented in parallel to the center line L, and with end faces which include an angle of, e.g., approximately 60° with the main axis.

From the top view onto the cooling jaw 25 according to FIG. 8A it is apparent that the nose projection 26 resting on the crystal 5 also extends obliquely under an angle of 60°, wherein in continuation of the in FIG. 8A upper edge of the nose projection 26, the cooling jaw 25 also has a stepped recess 28 with a borderline face which also extends under an angle of 60° to the center line L.

Figure 7A:
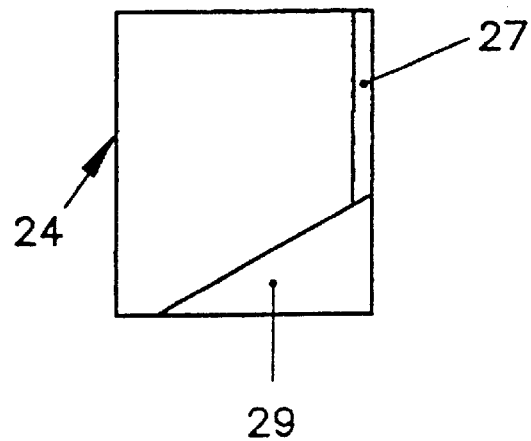

In the same way, the cooling jaw 24 has a stepped recess 29—also in an imaginary continuation of the nose projection 26, cf. also FIG. 2 and FIG. 7A, which likewise extends obliquely to the center line L under an angle of 60°.

The depth $T_1$ of the stepped portion 28 in the cooling jaw 25 and of the stepped portion 29 in the cooling jaw 24 is equal in size, yet larger than the depth $T_2$ of the stepped portion 27 in the cooling jaw 24. The height H of the nose projection 26 corresponds to the depth $T_2$ of the stepped portion 27, reduced by the thickness of crystal 5.

Thus, by the stepped recesses 28, 29 of the cooling jaws 24, 25, a clear space is provided for the respective laser beam 2 (cf. FIG. 2) which, via the free-lying end faces of the crystal 5, can pass into and out of the same.

For the passage of the laser beam 2, pipe sockets 30, 31 are mounted to the tubular casing 9 of the container 8 at opposite sides thereof, the outer ends of the pipe sockets being closed by windows 32, 33, and the windows 32, 33 being provided under an angle corresponding to the Brewster angle (e.g. 56°) relative to the main axis of the laser beam 2 so as to exclude reflections.

The somewhat larger cooling jaw 25 has two grooves or milled-in channels 34, 35 extending in parallel to the center line L which serve to accommodate fastening screws 36, 37, the heads of the screws 36, 37 being arranged to be embedded in long-hole-shaped counterbores 38, 39 in cooling jaw 25. The ends of the screws 36, 37 are screwed into threaded pocket bores 40 in the cooling pedestal 13 (cf. FIG. 2).

To evacuate the container 8, an externally angled pipe connection 41 is provided on the tubular casing 9. Via a cable passage means also arranged in the tubular casing 9 or via a vacuum-tight connecting plug 42, power is supplied for the Peltier elements 18. The evacuation pipe connection 41 may, e.g., be tightly closed after evacuation. If the overall tightness of the capsule-type container 8 cannot be maintained over extended periods of time, with the optical amplifier further in operation, also a pump (not illustrated) attached to the pipe connection 41 may be set into operation several times in between so as to evacuate the container 8—e.g. to a pressure of a few 10 mbar.

Figure 9:
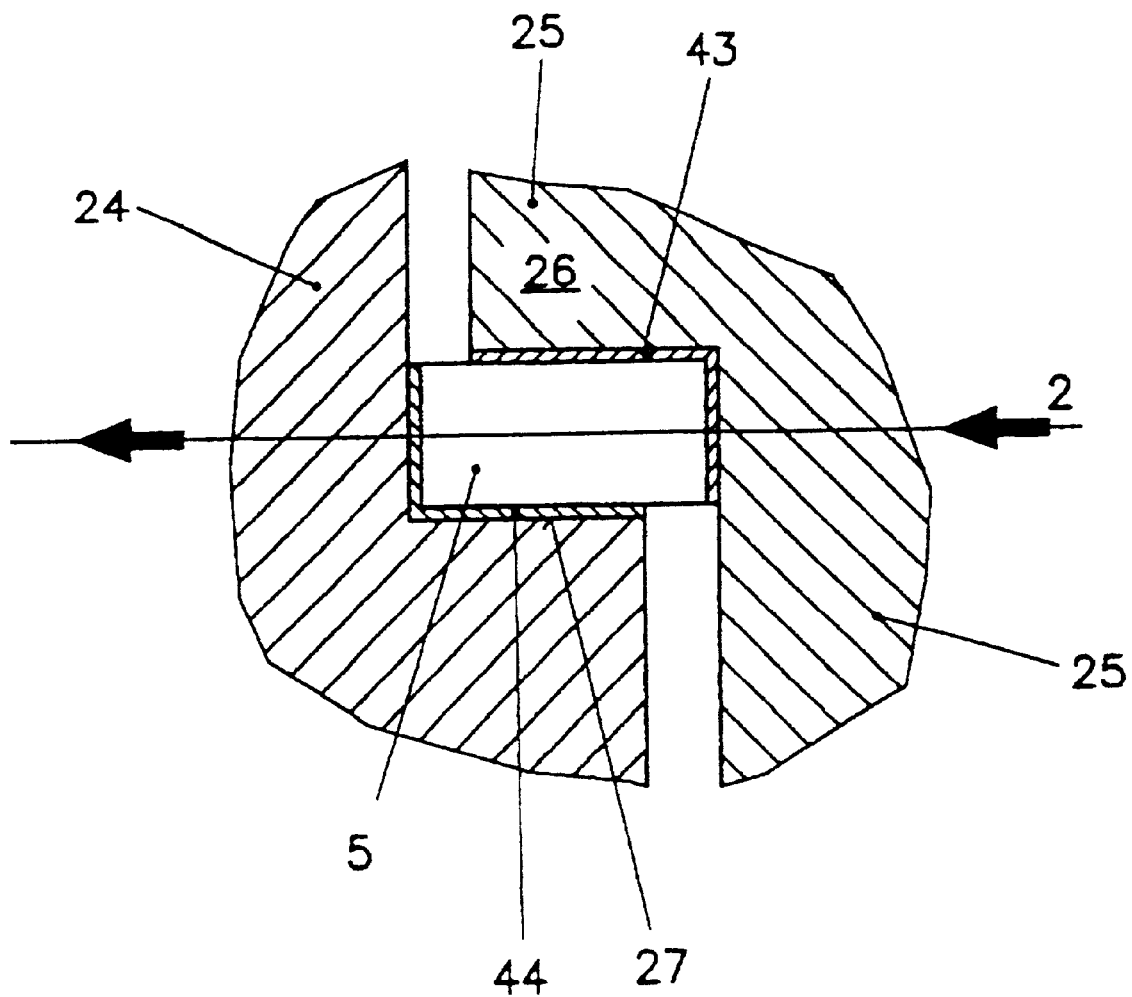
FIG. 9 shows in a detailed view on an enlarged scale the bracing of the laser crystal between the cooling jaws according to FIGS. 7A to 7C and 8A to 8C with indium foils interposed.

As is apparent from the detailed representation according to FIG. 9, the crystal 5 is embedded between the stepped recesses 28, 29 and the nose projection 36, respectively, of the two cooling jaws 24, 25 via foils 43, 44 of indium, resulting in a good heat transfer between the crystal 5 and the cooling jaws 24, 25.

Instead of an evacuation of the container 8, equipping of the latter (i.e., mounting of the Peltier elements and the laser crystal) could also be effected in a clean room, whereupon the container 8 is tightly closed by applying a desiccating substance known per se, such as silika gel, e.g. adjacent the cooling jaws 24, 25. In this manner, also a deposit of particles and condensation water droplets on the crystal 5 will be prevented.

Furthermore, a modified construction of the cooling device could also consist in mounting the crystal 5 sandwich-like between upper and lower Peltier elements, at whose external, i.e. respective upper or lower sides facing away from the crystal 5, a respective—e.g. plate-shaped—cooling pedestal abuts.

It is also possible and suitable in many instances to at least monitor, preferably control, the temperature of the crystal 5 in a known manner during operation; for this purpose, a thermosensor (not illustrated) may be inserted in one of the cooling jaws, e.g. 25, which is connected with a temperature monitoring or controlling circuit. In FIG. 8A, a bore 45 is shown in which such a per se conventional temperature sensor can be inserted.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cooling device for a highly thermally loaded optical crystal, comprising:
   a sealed housing for encasing the crystal, the housing having an exterior and having an evacuated interior providing a clean internal environment at the interior of the housing;
   Peltier elements in the housing interior to provide cooling for the crystal;
   a Brewster window communicating between the interior and the exterior of the housing;
   the Brewster window being arranged at an angle such that an incident laser light forms a Brewster angle with the Brewster window; and
   cooling jaws and the crystal is held between the cooling jaws which have good thermal conductivity and against which the Peltier elements rest.

2. A cooling device according to claim 1, wherein the cooling jaws are shaped and positioned to positively embrace and retain the crystal on four sides of the crystal.

3. A cooling device according to claim 1, wherein two of the cooling jaws engage the crystal on opposite sides thereof, one of the two jaws has a nose projection extending over the crystal and resting on the opposing cooling jaw, and the two cooling jaws are provided with recesses in the direction of the incident light for the incident light to pass therethrough.

4. A cooling device according to claim 1, further comprising a cooling pedestal; the Peltier elements having a warm side which faces away from the cooling jaws and which engages the cooling pedestal.

5. A cooling device according to claim 4, wherein the cooling pedestal is liquid-cooled.

6. A cooling device according to claim 4, wherein the cooling pedestal is comprised of a generally cylindrical body having an end side with a V-shaped recess which accommodates the Peltier elements and the cooling jaws with the crystal.

7. A cooling device according to claim 6, wherein the V-shaped recess comprises an apex angle of 90°.

8. A cooling device according to claim 6, wherein:
   the V-shaped recess defines oblique resting surfaces for the Peltier elements the resting surfaces having inner ends; and stops for the Peltier elements provided at the inner, adjacent ends of the resting surfaces that project upwardly from the resting surfaces.

9. A cooling device according to claim 4, wherein the cooling pedestal has an end side facing away from the Peltier elements, a flange at the end side of the pedestal and with which the tubular casing is tightly connected.

10. A cooling device according to claim 9, wherein the cooling pedestal includes bores for the passage of cooling liquid in the region of the flange.

11. A laser arrangement, comprising:
    a sealed housing having an interior and an exterior, the interior of the housing being provided with a clean environment;
    a highly thermally loaded crystal arranged in the interior of the housing;
    at least one Peltier element arranged in the interior of the housing and configured to cool the thermally loaded crystal to a temperature at which at least one of condensation and ice crystals would otherwise form on the crystal if the crystal were arranged in an un-clean environment; and
    at least one Brewster window communicating with the interior and the exterior of the housing, the Brewster window arranged at a Brewster angle with respect to an incident laser beam, whereby the clean environment of the interior of the housing prevents the at least one of condensation and ice crystals from forming on the highly thermally loaded crystal.

12. The laser arrangement according to claim 11, further comprising:
    a desiccant arranged in the interior of the housing to provide the clean environment.

13. The laser arrangement according to claim 12, wherein the at least one Peltier element includes at least two Peltier elements stacked together.

14. The laser arrangement according to claim 12, further comprising:
    cooling jaws coupled to the Peltier element; wherein the highly thermally loaded crystal is arranged between the cooling jaws.

15. The laser arrangement according to claim 14, wherein the highly thermally loaded crystal includes four sides, the cooling jaws being shaped and positioned to positively embrace and retain the crystal on the four sides.

16. The laser arrangement according to claim 14, wherein the cooling jaws include first and second cooling jaws and the highly thermally loaded crystal includes opposite sides, the first and second cooling jaws engaging the crystal on the opposite sides thereof, the first cooling jaw having a nose projection extending over the crystal and resting on the second cooling jaw, each of the first and second cooling jaws being provided with at least one recess in a direction of the incident laser beam.

17. The laser arrangement according to claim 14, further comprising:
    a cooling pedestal, wherein the Peltier element includes a warm side facing away from the cooling jaws and engaging the cooling pedestal.

18. The laser arrangement according to claim 17, wherein the cooling pedestal is liquid-cooled.

19. The laser arrangement according to claim 17, wherein the cooling pedestal has a generally cylindrical body with an end side provided with a V-shaped recess to accommodate the Peltier element, the cooling jaws, and the crystal.

20. The laser arrangement according to claim 17, wherein the cooling pedestal has an end side and a flange arranged at the end side, the end side facing away from the Peltier element.

21. The laser arrangement according to claim 19, wherein the V-shaped recess defines an apex angle of ninety degrees.

22. The laser arrangement according to claim 19, wherein the V-shaped recess defines oblique resting surfaces to accommodate the Peltier element, the resting surfaces having inner ends and stops that project upwardly from the resting surfaces.

23. The laser arrangement according to claim 12, wherein the housing includes a tubular casing and a lid to close the tubular casing.

24. The laser arrangement according to claim 11, wherein the interior of the housing is evacuated, the evacuated interior providing the clean environment.

25. The laser arrangement according to claim 24, further comprising:

an evacuation device in communication with the interior of the housing and configured to provide the evacuated interior.

26. The laser arrangement according to claim 24, wherein the at least one Peltier element includes at least two Peltier elements stacked together.

27. The laser arrangement according to claim 24, further comprising:

cooling jaws coupled to the Peltier element; wherein the highly thermally loaded crystal is arranged between the cooling jaws.

28. The laser arrangement according to claim 27, wherein the highly thermally loaded crystal includes four sides, the cooling jaws being shaped and positioned to positively embrace and retain the crystal on the four sides.

29. The laser arrangement according to claim 27, wherein the cooling jaws include first and second cooling jaws and the highly thermally loaded crystal includes opposite sides, the first and second cooling jaws engaging the crystal on the opposite sides thereof, the first cooling jaw having a nose projection extending over the crystal and resting on the second cooling jaw, each of the first and second cooling jaws being provided with at least one recess in a direction of the incident laser beam.

30. The laser arrangement according to claim 29, further comprising:

a cooling pedestal, wherein the Peltier element includes a warm side facing away from the cooling jaws and engaging the cooling pedestal.

31. The laser arrangement according to claim 30, wherein the cooling pedestal is liquid-cooled.

32. The laser arrangement according to claim 30, wherein the cooling pedestal has a generally cylindrical body with an end side provided with a V-shaped recess to accommodate the Peltier element, the cooling jaws, and the crystal.

33. The laser arrangement according to claim 30, wherein the cooling pedestal has an end side and a flange arranged at the end side, the end side facing away from the Peltier element.

34. The laser arrangement according to claim 32, wherein the V-shaped recess defines an apex angle of ninety degrees.

35. The laser arrangement according to claim 32, wherein the V-shaped recess defines oblique resting surfaces to accommodate the Peltier clement, the resting surfaces having inner ends and stops that project upwardly from the resting surfaces.

36. The laser arrangement according to claim 24, wherein the housing includes a tubular casing and a lid to close the tubular casing.

* * * * *